United States Patent [19]

Mann

[11] 4,264,346
[45] Apr. 28, 1981

[54] DIESEL EXHAUST PARTICULATE TRAPS

[75] Inventor: Gamdur S. Mann, Flint, Mich.

[73] Assignee: General Motors Corporation, Detroit, Mich.

[21] Appl. No.: 102,873

[22] Filed: Dec. 12, 1979

[51] Int. Cl.³ .................. B01D 39/20; C04B 21/06
[52] U.S. Cl. ........................... 55/523; 55/DIG. 30; 210/510; 60/311; 428/73; 428/316; 428/317
[58] Field of Search ............... 55/523, DIG. 30; 210/505, 508, 509, 510; 252/477 R; 428/73, 116–118, 411; 106/40 R; 60/295, 299, 300, 311

[56] References Cited
U.S. PATENT DOCUMENTS

| 3,487,916 | 1/1970 | Moroni et al. | 106/40 R |
| 3,920,428 | 11/1975 | Kinsley, Jr. | 55/528 |
| 3,937,015 | 2/1976 | Akado et al. | 60/288 |
| 4,040,591 | 8/1977 | Noll et al. | 428/117 |
| 4,041,592 | 8/1977 | Kelm | 428/117 |
| 4,054,417 | 10/1977 | Rosebrock | 55/285 |
| 4,083,905 | 4/1978 | Insley et al. | 264/44 |

Primary Examiner—David L. Lacey
Attorney, Agent, or Firm—Robert J. Outland

[57] ABSTRACT

Related arrangements of diesel exhaust particulate traps are disclosed wherein particulate filter elements are formed from porous ceramic monoliths made of high temperature ceramic and containing passage defining micronic pores intercepted by high temperature ceramic fibers retained in the ceramic substrate and extending into the passages to provide surfaces for separating particulates from the gases passed through the element.

3 Claims, 6 Drawing Figures

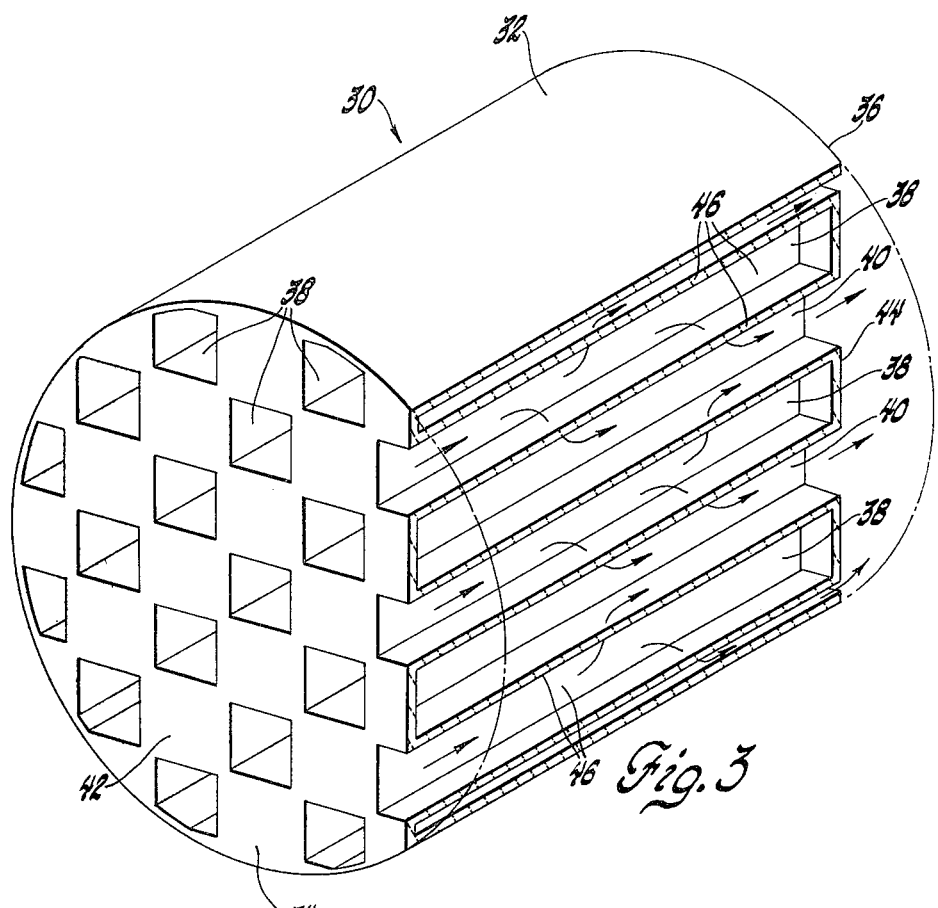
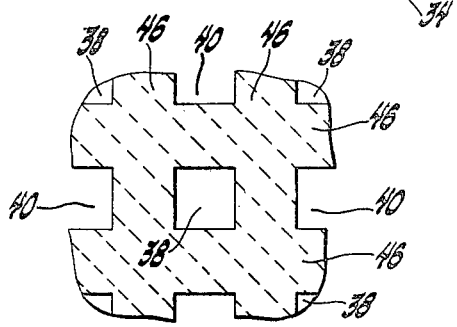
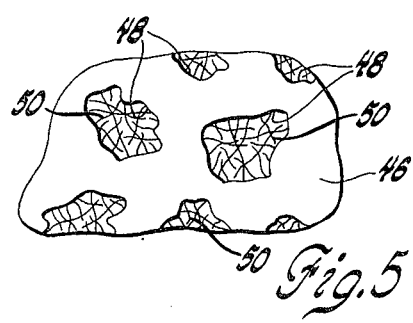
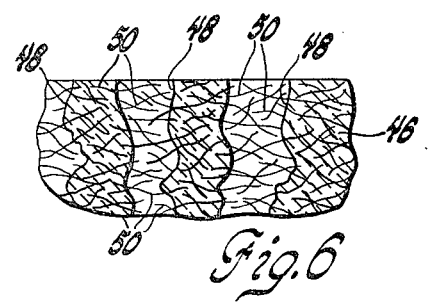

DIESEL EXHAUST PARTICULATE TRAPS

TECHNICAL FIELD

This invention relates to particulate traps for diesel engine exhaust systems and more particularly to arrangements of monolithic high temperature porous ceramic filter elements having embedded ceramic fibers.

BACKGROUND OF THE INVENTION

The question of how best to reduce the levels of particulate matter expelled to atmosphere in the exhaust gases of automotive diesel engines is currently of considerable interest. In this connection, it is desired to develop efficient and practical devices and methods for removing substantial portions of particulates from the exhaust gases in diesel engine exhaust systems before permitting the exhaust gases to escape to atmosphere.

It is recognized that, to be successful, a diesel engine exhaust particulate trap must have certain characteristics, some of which are (1) chemical stability at the maximum operating temperatures encountered in the engine exhaust system (2) adequate thermal shock resistance to withstand frequent and irregular temperature changes recurrent in exhaust systems during vehicle operation and (3) capability of being packaged in a suitable manner to avoid failure due to vibration and other stresses encountered during vehicle operation. Certain ceramic materials have been found to meet the above criteria adequately, as is shown by their use in catalytic converters used for exhaust emission control in gasoline powered vehicle engines. Thus, it has been proposed to utilize porous walled ceramics of the type used for monolithic engine exhaust catalyst devices in making filter elements for diesel exhaust particulates.

SUMMARY OF THE INVENTION

The present invention provides various designs and methods of constructing porous walled ceramic filter elements having materials and structure appropriate to accomplish the desired purposes.

It is a feature of the invention that the filter elements are constructed using high temperature ceramic materials, such as cordierite, which are capable of withstanding the stresses and temperatures encountered in diesel engine exhaust systems for extended periods.

The invention further provides temperature resistant ceramic fibers in the porous passages of the ceramic substrate material to form additional surfaces for the impaction and collection of particulates in the exhaust gases.

A feature of one form of the invention is that the substrate is formed as a monolithic ceramic foam having interconnecting pores defining passages into which extend ceramic fibers, embedded in the ceramic substrate forming the passage walls.

In another form of the invention, the ceramic substrate is formed as a porous walled monolith having extruded passages formed by walls pervious to gas passage and in the pores of which embedded ceramic fibers extend across the gas flow passages.

The various forms of the invention provide for the use of high temperature ceramic substrate materials of proven capability for use in engine exhaust systems and capable of being fashioned by methods currently available in the ceramics field to provide diesel exhaust particulate filter elements of high efficiency and collection volume.

These and other features and advantages of the invention will be more fully understood from the following description of certain preferred embodiments taken together with the accompanying drawings.

BRIEF DESCRIPTION OF THE DRAWINGS

In the drawings:

FIG. 3 is a pictorial view of an alternative embodiment of filter element having extruded parallel passages with alternate ends plugged and defined by gas pervious walls in accordance with the invention;

FIG. 4 is an enlarged cross-sectional view of a portion of a monolith structure similar to FIG. 3, showing the relative sizes of the extruded channels and walls in one form of the invention;

FIG. 5 is an enlarged face view of one of the extruded wall sections of the monolith of FIG. 3, showing the gas pervious, channel-forming pores with their extending fibers, and FIG. 6 is an enlarged cross-sectional view through a portion of one of the walls of the monolith of FIG. 3, showing the form of the gas pervious pores and embedded fibers.

BEST MODES FOR CARRYING OUT THE INVENTION

Figure 1:
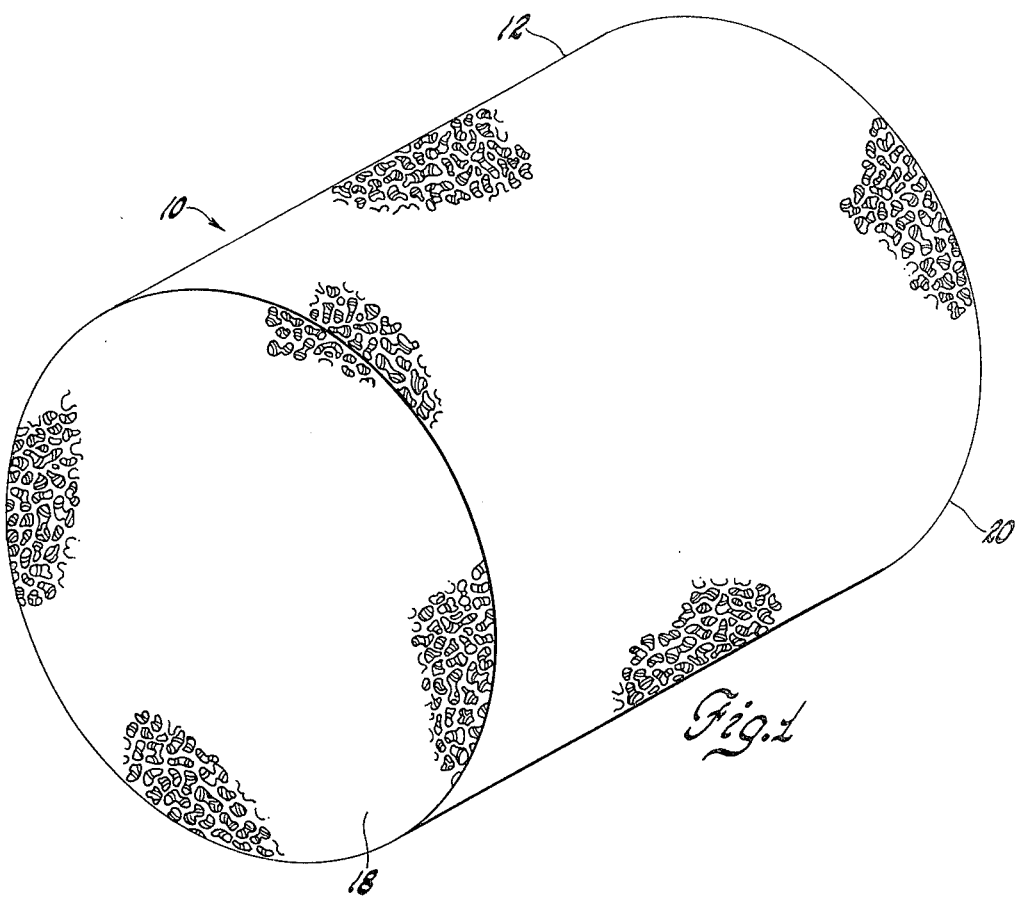
FIG. 1 is a pictorial view of a filter element of the ceramic foam type formed in accordance with the principles of the invention.
Figure 2:
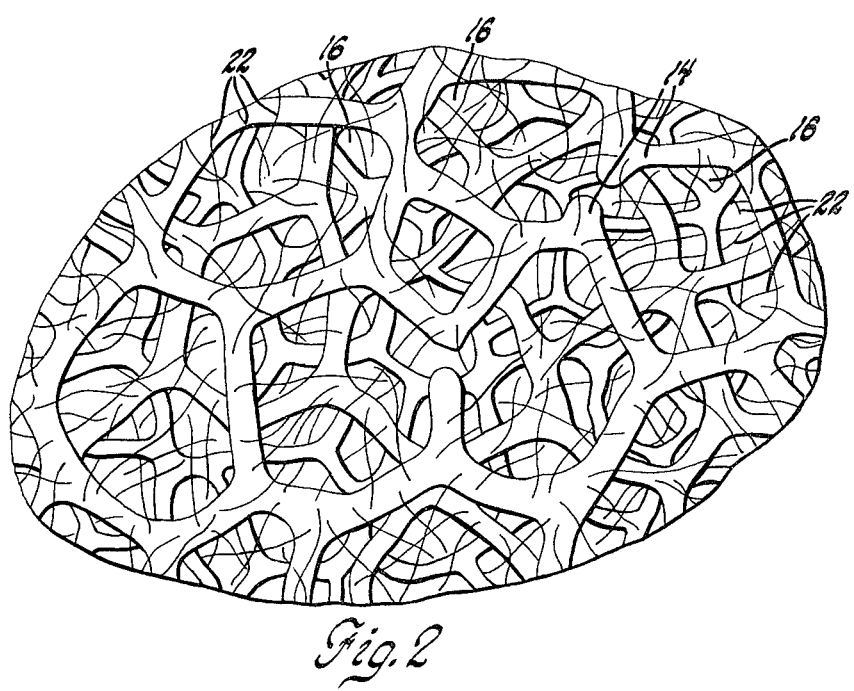
FIG. 2 is an enlarged view of a portion of the ceramic filter element of FIG. 1 showing, greatly enlarged, a representation of the porous structure and embedded filaments of the element body.

FIGS. 1 and 2 of the drawings illustrate one preferred embodiment of the invention wherein numeral 10 generally indicates a diesel engine exhaust particulate trap having a filter or trapping element 12 of cylindrical configuration.

The element 12 comprises a rigid body or substrate of foam-like high temperature ceramic having relatively high mechanical strength and thermal shock resistance. The element has interconnecting ceramic walls 14 which define an open pattern of micronically sized interconnected pores 16 (shown greatly enlarged) which join together to form irregular passages extending through the element from one end 18 to the other 20.

The interconnected walls 14 are made sufficiently strong to provide the monolithic element with adequate strength to resist failure when used as a filter or trapping element in a diesel engine exhaust system. The pores defined by the wall structure are sufficiently large and numerous to permit relatively free flow of exhaust gases through the element between the opposite ends 18, 20.

In order to provide surfaces for the trapping of particulates within the passages formed by the interconnected pores 16, the passages are interlaced by a large number of fine ceramic hair-like fibers on filaments 22, having portions thereof fixed within the interconecting walls 14 and extending into the pores 16 to provide interlaced fibers projecting randomly into the passages across the path of exhaust gas flow. These fibers provide a base, in addition to that of the interlaced walls 14, on which to collect particulates from diesel engine exhaust gases passed through the filter without adding a significant amount of resistance to gas flow through the filter.

In use, the filter element 12 is located in a suitable housing in the exhaust system of a diesel engine so that exhaust gases from the engine are passed therethrough. During operation of the engine, particulates in the exhaust gases impinge upon the interconnecting walls 14 and the fibers 22 extending into the passages formed by the interconnected pores 16. Particulates are thus collected and trapped or filtered out from the exhaust gases which pass through the filter to the exhaust outlet.

When the body of collected particulates within the filter reaches a high enough level, the particulates, which are largely formed of combustible carbonaceous materials and soluble matter, may be removed by heating the ceramic filter element to the incineration temperature of the particulates in the presence of sufficient oxygen to burn them off, thereby regenerating the filter for continued filtration in the engine exhaust system. Other methods of cleaning may, of course, also be utilized.

The filter element may be constructed in any suitable manner according to known methods and using suitable materials capable of accomplishing the desired purposes as are known in the ceramics art. For example, the ceramic substrate comprising the foam-like porous wall structure may be made of cordierite, a mixture of magnesium aluminum and silicon oxides in the approximate ratios of $2MgO + 2Al_2O_3 + 5 SiO_2$ while the ceramic fibers may be made from alumina, alumina silicate or some other equivalent high temperature, high strength material.

The element may be manufactured for example by mixing the high temperature ceramic fibers with a urethane material which is then formed by conventional processes into a sponge like foam having open passages with ceramic fibers randomly disposed therethrough. After curing, the foam is saturated with a slurry of ceramic material such as cordierite which will ultimately form the base substrate structure. The cordierite saturated foam is then dried and the material is fired at high temperature so that the urethane material is burned out and there remains the rigid structure of cordierite substrate with high temperature fibers retained in the interlaced walls and extending into the porous openings left by the burning away of the urethane material.

Referring now to FIGS. 3 through 6 of the drawings, there is illustrated a differing preferred embodiment of the invention in which a high strength ceramic substrate is combined with high temperature fibers in an embodiment substantially different than that first described. In this embodiment, the particulate trap, generally indicated by numeral 30, comprises a monolithic ceramic trap or filter element 32 of generally cylindrical form and having an inlet end 34 and an outlet end 36. In this case, the monolith is formed with a large number of small sized parallel passages square or equivalent cross-section including inlet passages 38 and outlet passages 40 which are arranged in vertical and horizontal alternating relationship. The outlet passages are blocked at the inlet end of the filter element by wall means 42, while the inlet passages are, in like fashion, blocked at the outlet end of the element by wall means 44.

The inlet and outlet passages are defined within the element 32 by a plurality of porous walls 46 which are pervious to gas flow and provide surfaces for the collection of particulates from engine exhaust gas passed therethrough. The thicknesses of the walls and the sizes of the inlet and outlet passages 38, 40 may be selected as desired in order to provide adequate strength of the ceramic structure and a suitable passage size for encouraging free flow of exhaust gases through the element. The cross-sectional view of FIG. 4 illustrates one possible arrangement where the sides of the passages 38, 40 and the thicknesses of the walls 44 have equal dimensions of, for example, 0.050 inches. Such an arrangement has been suggested as being the most efficient for providing a maximum area of filtration surface along the sides of the inlet passages in a filter structure of any particular size. It is, however, possible to select any suitable dimensions of the passages and their supporting walls which will accommodate the desired purposes.

FIGS. 5 and 6 illustrate, in greatly enlarged views, the porous character of the walls 44. These walls include a large number of micronic sized irregular pores 48 which extend through the walls to permit gas to pass therethrough. Within the wall material there are retained a large number of high temperature fibers 50 which extend along the gas flow passages and provide a supporting base for the collection of particulates in much the same fashion as in the first described embodiment. The use of such fibers permits the pores 48 in the walls to be made larger so as to provide lower restriction to gas flow, while maintaining more efficient collection of particulates than would be possible without the addition of the ceramic fibers.

The particulate trap or filter element of FIGS. 3 through 6 may be made from any suitable materials and is preferably constructed of the same basic materials as previously described for use in the embodiment of FIGS. 1 and 2. Construction of an element in accordance with FIGS. 3 through 6 may be accomplished by providing a suitable mixture of ceramic, such as cordierite, having suitable pore forming ingredients with randomly dispersed ceramic fibers of suitable material, such as alumina. This mixture is then formed into an open ended monolith, such as by extrusion in accordance with known procedures. After drying and firing the monolith, the opposite ends of the inlet and outlet passages are plugged to form the walls 42, 44 and the plugging material may be hardened in accordance with known procedures. In the process of firing the monolith body, the burn-off of pore forming materials in the ceramic structure leaves the porous walls with intersecting ceramic fibers as shown, providing open passages suitable for use in the collection of particulates on the inlet passage walls when exhaust gas is passed therethrough. This disclosure of a specific method of construction is, of course, exemplary and not intended to limit the manner in which trap elements in accordance with the invention may be constructed.

While the invention has been described by reference to certain preferred embodiments chosen for purposes of illustration, it should be understood that numerous modifications and changes could be made in the features of the described embodiments without departing from the inventive concepts disclosed. Accordingly, it is intended that the invention not be limited except by the lauguage of the following claims.

The embodiments of the invention in which an exclusive property or privilege is claimed are defined as follows:

1. A particulate trapping element for cleaning diesel engine exhaust gases and the like, said element comprising a monolithic body of porous high temperature ceramic defining a large number of micronic pores forming through-extending irregular cross-section passages pervious to high volume gas flow, and a distributed mass of fine ceramic fibers retained in said ceramic body and extending into said passages to promote the separation and trapping of particulates from gases passed through said element.

2. A particulate trapping element for cleaning diesel engine exhaust gases and the like, said element comprising a monolithic body of foam-like porous high temperature ceramic having interlaced walls defining a large number of interconnected micronic pores forming through-extending irregular cross-section passages pervious to high volume gas flow, and a randomly distributed mass of fine ceramic fibers retained in said ceramic body and extending into said passages to promote the separation and trapping of particulates from gases passed through said element.

3. A particulate trapping element for cleaning diesel engine exhaust gases and the like, said element comprising a monolithic body of high temperature ceramic having interconnected internal walls defining a plurality of parallel small inlet channels open at one end of the element and extending adjacent a plurality of parallel small outlet channels open at the other end of the element, said walls having a large number of micronic pores forming through-extending irregular cross-section passages pervious to gas flow, and a distributed mass of fine ceramic fibers retained in said ceramic body and extending into said passages to promote the separation and trapping of particulates from gases passed through said element.

* * * * *